Patented Sept. 16, 1947

2,427,403

UNITED STATES PATENT OFFICE 2,427,403

PROCESS FOR PREPARATION OF CELLULOSE ESTERS

Clifford I. Haney, Greenwich, Conn., and Mervin E. Martin and Arnold J. Rosenthal, Cumberland, Md., assignors to Celanese Corporation of America, a corporation of Delaware No Drawing. Application March 9, 1944, Serial No. 525,756

4 Claims. (Cl. 260—230)

This invention relates to the production of organic esters of cellulose, and relates more particularly to the production of cellulose acetate or other cellulose esters of improved properties and characteristics.

An object of our invention is the production of organic esters of cellulose of substantially undegraded molecular structure.

Another object of our invention is the production of organic esters of cellulose of relatively low degree of esterification and possessing a substantially undegraded molecular structure.

Still another object of our invention is to provide an improved process for the production of organic esters of cellulose of relatively low degree of esterification which may be molded at relatively low temperatures.

Other objects of our invention will appear from the following detailed description.

Organic esters of cellulose are usually prepared by esterifying cellulose with an organic acid anhydride in the presence of a catalyst and an organic acid solvent diluent for the cellulose ester being formed. The cellulose ester is obtained as a viscous, homogeneous solution in the organic acid solvent diluent employed. Water is then added to the solution in an amount sufficient to convert all of the acid anhydride remaining to the corresponding acid, and, after the addition of a further quantity of water, the cellulose ester is permitted to ripen or hydrolyze to develop the desired solubility characteristics. After ripening, the cellulose ester is precipitated from solution by the addition of water or other non-solvent to the solution and the precipitated ester is then washed and dried.

In preparing cellulose acetate in accordance with the above process, cellulose, with or without a pre-treatment with organic acids containing some sulfuric acid, is usually acetylated by treatment with acetic anhydride and a catalyst, such as sulfuric acid, in the presence of glacial acetic acid as a solvent diluent for the cellulose acetate formed. The sulfuric acid catalyst is normally present in amounts of from 9 to 15%, or even 20%, on the weight of the cellulose. Part of this sulfuric acid may be introduced during the pretreatment which is designed to render the cellulose more reactive.

When the acetylation is completed, water is stirred into the reaction mixture to convert the excess acetic anhydride to acetic acid, and, after the addition of a further amount of water, the resulting solution of cellulose acetate in acetic acid, containing the sulfuric acid employed as the catalyst, is permitted to stand and to ripen until the desired solubility characteristics are reached. During this ripening period, not only are acetyl groups split off, but in addition, combined sulfuric acid is also split off. The desired solubility characteristics are reached, usually, when the cellulose acetate has an acetyl value of 53 to 56%, calculated as acetic acid. At this point further ripening is halted and the solution is treated with a large excess of water or other non-solvent to precipitate the cellulose acetate. The precipitated cellulose acetate is washed with water to remove as much acid and other soluble materials as possible. After washing, the cellulose acetate is subjected to a stabilizing treatment, usually by heating it in suspension in very dilute sulfuric acid, with the object of still further reducing its content of combined sulfuric acid and other sulfur compounds. Sulfur compounds impair the stability of the cellulose acetate and impart thereto a tendency to decompose, degrade and/or discolor. The degree of stability is measured by the acidity developed when a sample of cellulose acetate is treated with distilled water under conditions of elevated temperature and pressure for a predetermined period of time. The development of excessive acidity denotes a product of unsatisfactory stability.

The ripening of the cellulose acetate is usually interrupted, as stated, when the ester has an acetyl value of 53 to 56%, for esters in this range have at the present time the most extensive commercial application in the preparation of yarns, filaments, films, foils, plastic molding compositions, and the like. Esters of a lower degree of esterification have been found to be of value for certain technical and commercial applications. The preparation of esters of a lower degree of esterification by continuing the ripening of the higher ester in the usual manner beyond the point where esters of 53 to 56% acetyl value are obtained has not yielded entirely satisfactory esters. Not only are the esters of lower degree of esterification produced by continuing ripening in the usual manner lacking in stability but the average molecular weight of the cellulose molecules is lower and this lowering of the molecular weight is reflected by a decrease in the tenacity of yarns or filaments spun from those cellulose esters of relatively low degree of esterification.

We have now discovered that cellulose acetates, as well as other organic esters of cellulose, of relatively low degree of esterification as compared to those so widely employed commercially, may be obtained in a stable form with relatively little molecular degradation by a novel ripening process. In accordance with the process of our invention, these valuable cellulose esters may be obtained if, after an esterification reaction as heretofore described, the cellulose acetate produced is ripened in solution at an elevated temperature in the presence of a reduced amount of catalyst while water for ripening is added continuously over the course of a substantial period of the ripening or hydrolysis reaction. When the ripening has proceeded until the cellulose acetate has reached the desired acetyl value, the ripening is halted and the cellulose acetate is precipitated from solution.

The ripening is effected after up to 100%, and preferably about 66%, of the catalyst present is neutralized. The temperature at which ripening is carried out, following the partial neutralization of the catalyst, may be from 50 to 117° C. Usually, the partially neutralized primary solution of cellulose acetate is maintained at a lower temperature, e. g., 25 to 50° C., say 30° C., for 10 to 100 minutes, before the temperature is raised to the desired ripening temperature. After the desired ripening temperature is reached, water for ripening is streamed in continuously. The water addition is continued over a substantial period during the course of the ripening. Usually from 10 to 300% of water on the weight of the cellulose esterified is added per hour and the addition is continued until a total of 100 to 1200% on the weight of the cellulose is added. Ripening is then continued without further water addition until the desired acetyl value, say 20 to 45%, or in some instances, 55%, is reached. Ripening is halted and the cellulose acetate in solution is precipitated by the addition of an excess of water to the ripening solution. Other non-solvents, such as alcohol, may be used for precipitation of the cellulose acetate.

The water for ripening may be added as such or, more advantageously, may be added in the form of a dilute solution of acetic acid to avoid any local precipitation of the cellulose acetate. The neutralizing agent for the catalyst may be added together with the water for ripening, particularly if the latter is added as a dilute aqueous solution of acetic acid. However, it may also be added in solution in glacial acetic acid, or separately in powder form.

The neutralizing agent employed may be a salt of magnesium or calcium, such as magnesium acetate, calcium acetate, magnesium carbonate, or calcium carbonate. Zinc acetate, zinc oxide, or the oxides, carbonates or hydroxides of aluminum, barium, copper, lithium and strontium, as well as organic acid salts of these metals may also be employed as the neutralizing agent. Mixtures of any two or more of these compounds may also be employed as the neutralizing agent. The neutralizing agent preferably employed in accordance with this invention comprises a mixture of magnesium acetate and calcium acetate.

The cellulose may, prior to acetylation, be pretreated with acetic acid or formic acid, or mixtures of these acids to render the cellulose more reactive. The acids may be used in small amounts, for example, 1 to 50% on the weight of the cellulose, or in much larger quantities, for example, 100%, 200% or even 300% on the weight of the cellulose, and may contain a small quantity of sulfuric acid, for instance, ½ to 1 or 2% on the weight of the cellulose. The pretreatment is preferably allowed to go on for some hours, for example, overnight, though much shorter periods may be used when sulfuric acid is present. The pretreated cellulose is then treated with acetic anhydride and sulfuric acid in appropriate amounts to bring about acetylation.

The cellulosic materials to be esterified in accordance with our process may be any suitable form of cellulose or cellulose derivative. It may be cotton, cotton linters, wood-pulp, regenerated cellulose, or other cellulosic material obtainable from various other sources such as grasses, straws, hulls and the like.

In order to illustrate our invention but without being limited thereto, the following example is given:

*Example*

170 parts by weight of cotton linters are acetylated with an acetylation mixture comprising 389 parts by weight of acetic anhydride, 643 parts of glacial acetic acid and 23.4 parts by weight of sulfuric acid. A peak temperature of 37° C. is reached and acetylation is completed in 3 hours. Sufficient water is then added to destroy excess acetic anhydride, and 66% of the sulfuric acid present is then neutralized by the addition of an aqueous solution of a neutralizing agent, the water added with the neutralizing agent comprising 42% on the weight of the original cellulose acetylated. The solution is held at a temperature of about 33° C. for about 30 minutes and the temperature is then raised to 60° C. over the course of about one hour. The continuous addition of water for ripening is then begun, the water being added initially at an hourly rate of about 58% on the weight of the cellulose acetylated and, after an hour, the rate is cut to about 33% per hour. A total of 358% of water is added over 10 hours. Ripening is continued for an additional 16 hours while maintaining the temperature at about 60% C. until the acetyl value reaches 44.3%, calculated as acetic acid. The cellulose acetate is precipitated from solution by the addition of a large amount of water to the solution, and is then washed and dried. The cellulose acetate obtained is stable and little degradation of the molecule has been caused as witnessed by its high molecular weight.

While our invention is particularly described in connection with the acetylation of cellulose employing sulfuric acid as catalyst, other catalysts such as, for example, phosphoric acid, or mixtures of phosphoric acid and sulfuric acid may be used as well. Preferably we employ sulfuric acid alone without any other mineral acid present during either acetylation or ripening. In a similar way, employing the proper esterifying agent or agents, other cellulose esters may be prepared, for example, the cellulose esters of propionic, butyric, or similar acids, or mixed esters, for example, cellulose acetate-propionate or cellulose acetate-butyrate.

The organic esters of cellulose of relatively low degree of esterification prepared in accordance with our invention may be employed for the production of textile materials such as yarns, threads, filaments, fibers, and the like, by wet or dry spinning processes or by processes involving the extrusion of filaments through a suitable spinneret while the cellulose ester is in a plastic form. The organic esters of cellulose may also be employed for the production of molding compositions and plastic masses, as well as for the preparation of other commercial and technical materials. The cellulose acetate filaments may be softened in hot water to yield stretched yarns of very high tenacity. The tenacity of the stretched yarns may be even further enhanced by saponifying the stretched organic ester of cellulose yarns.

It is to be understood that the foregoing detailed description is given merely by way of illustration and that many variations may be made therein without departing from the spirit of our invention.

Having described our invention, what we desire to secure by Letters Patent is:

1. Process for the preparation of cellulose acetate, which comprises acetylating cellulose by means of acetic anhydride in the presence of acetic acid as solvent and from 9 to 15% of sulfuric acid on the weight of the cellulose as catalyst, neutralizing up to 100% of the sulfuric acid present by the addition of a neutralizing agent, raising the temperature of the acetylation mixture up to ripening temperature, and ripening the cellulose acetate so produced to the desired acetyl value at an elevated temperature, while adding water continuously to the ripening cellulose acetate at an hourly rate of 10 to 300% on the weight of the original cellulose until the total water added for ripening comprises 100 to 1200% on the weight of the original cellulose.

2. Process for the preparation of cellulose acetate, which comprises acetylating cellulose by means of acetic anhydride in the presence of acetic acid as solvent and from 9 to 15% of sulfuric acid on the weight of the cellulose as catalyst, neutralizing up to 100% of the sulfuric acid present by the addition of a neutralizing agent, raising the temperature of the acetylation mixture up to ripening temperature, and ripening the cellulose acetate so produced to the desired acetyl value while adding water continuously to the ripening cellulose acetate at an hourly rate of 10 to 300% on the weight of the original cellulose until the total water added for ripening comprises 100 to 1200% on the weight of the original cellulose.

3. Process for the preparation of cellulose acetate, which comprises acetylating cellulose by means of acetic anhydride in the presence of acetic acid as solvent and from 9 to 15% of sulfuric acid on the weight of the cellulose as catalyst, neutralizing up to 100% of the sulfuric acid present by the addition of a neutralizing agent, raising the temperature of the acetylation mixture up to ripening temperature, and ripening the cellulose acetate so produced to the desired acetyl value while adding water continuously to the ripening cellulose acetate at an hourly rate of 10 to 300% on the weight of the original cellulose until the total water added for ripening comprises 100 to 1200% on the weight of the cellulose.

4. Process for the preparation of organic esters of cellulose, which comprises esterifying cellulose by means of an aliphatic acid anhydride in the presence of an organic acid solvent and an inorganic acid catalyst, neutralizing up to 100% of the inorganic acid catalyst present by the addition of a neutralizing agent, raising the temperature of the esterification mixture up to ripening temperature, and ripening the cellulose ester so produced to the desired acyl value at an elevated temperature while adding water continuously to the ripening cellulose ester at an hourly rate of 10 to 300% on the weight of the original cellulose until the total water added for ripening comprises 100 to 1200% on the weight of the original cellulose.

CLIFFORD I. HANEY.
MERVIN E. MARTIN.
ARNOLD J. ROSENTHAL.

REFERENCES CITED

The following references are of record in the file of this patent:

UNITED STATES PATENTS

| Number | Name | Date |
|---|---|---|
| 2,013,830 | Malm | Sept. 10, 1935 |
| 1,993,782 | Haney | Mar. 12, 1935 |
| 2,285,536 | Seymour | June 9, 1942 |